United States Patent [19]

Yamada

[11] Patent Number: 4,907,286
[45] Date of Patent: Mar. 6, 1990

[54] IMAGE PROCESSING APPARATUS

[75] Inventor: Masanori Yamada, Kawasaki, Japan

[73] Assignee: Canon Kabushiki Kaisha, Tokyo, Japan

[21] Appl. No.: 204,914

[22] Filed: Jun. 10, 1988

Related U.S. Application Data

[63] Continuation of Ser. No. 839,528, Mar. 14, 1986.

[30] Foreign Application Priority Data

Mar. 20, 1985 [JP]  Japan ................................. 60-57898

[51] Int. Cl.⁴ ............................................. G06K 9/38
[52] U.S. Cl. ...................................... 382/51; 358/456; 358/464
[58] Field of Search ............... 358/282, 283, 166, 456, 358/457, 464; 382/18, 51

[56] References Cited

U.S. PATENT DOCUMENTS

| | | | |
|---|---|---|---|
| 4,339,745 | 7/1982 | Barber et al. | 382/51 |
| 4,351,004 | 9/1982 | Choate et al. | 358/282 |
| 4,365,304 | 12/1982 | Ruhman et al. | 358/166 |
| 4,411,015 | 10/1983 | Scherl et al. | 382/51 |
| 4,446,486 | 5/1984 | Itoh | 358/282 |
| 4,468,703 | 8/1984 | Fujiwara et al. | 382/51 |
| 4,547,811 | 10/1985 | Ochi et al. | 382/9 |
| 4,549,220 | 10/1985 | Suzuki | 358/283 |
| 4,578,712 | 3/1986 | Matsunawa | 382/51 |
| 4,589,034 | 5/1986 | Yokomizo | 358/282 |
| 4,601,057 | 7/1986 | Tsuji et al. | 382/51 |
| 4,623,938 | 11/1986 | Asano et al. | 358/282 |
| 4,667,237 | 5/1987 | Yokomizo | 358/282 |
| 4,675,909 | 6/1987 | Egami et al. | 382/18 |
| 4,686,579 | 8/1987 | Sakamoto | 358/283 |
| 4,698,691 | 10/1987 | Suzuki et al. | 358/283 |

Primary Examiner—Leo H. Boudreau
Attorney, Agent, or Firm—Fitzpatrick, Cella, Harper & Scinto

[57] ABSTRACT

An image processing apparatus has a CCD sensor for reading an original image, a means for setting a processing mode suitable for each original image, a detecting means for detecting the state of the original image, and a processing means for processing the image signal read by the sensor in accordance with the set processing mode and the detected image state.

15 Claims, 13 Drawing Sheets

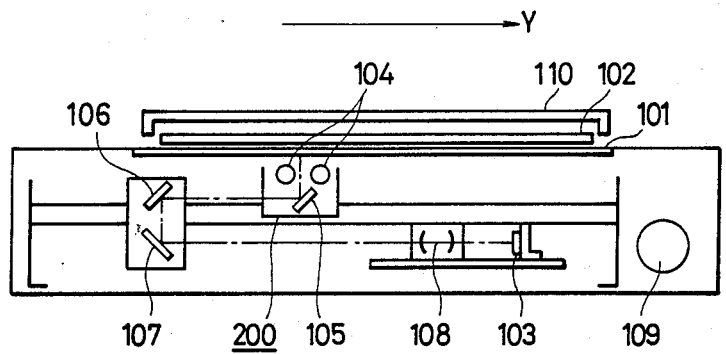
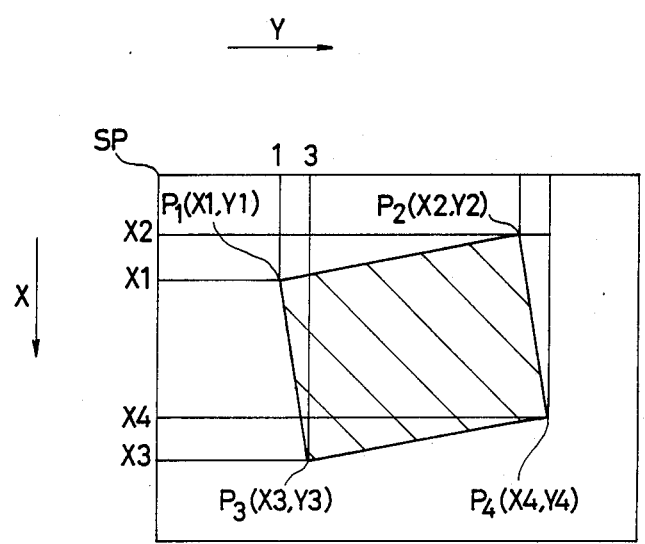

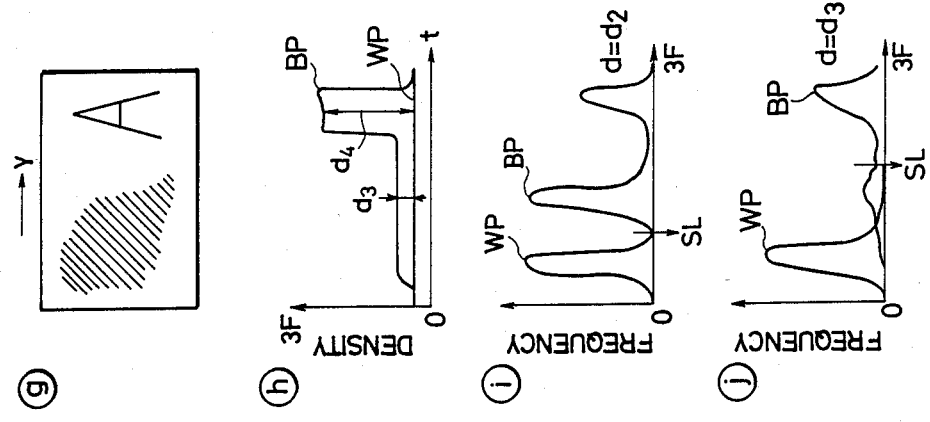
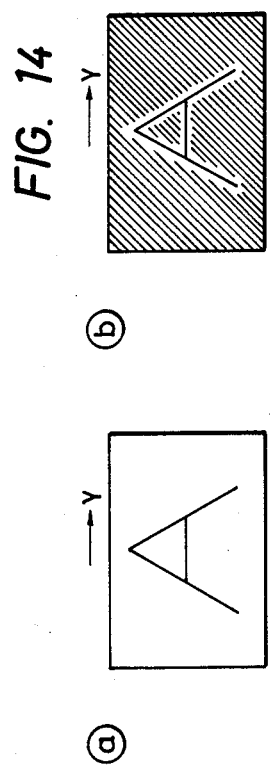
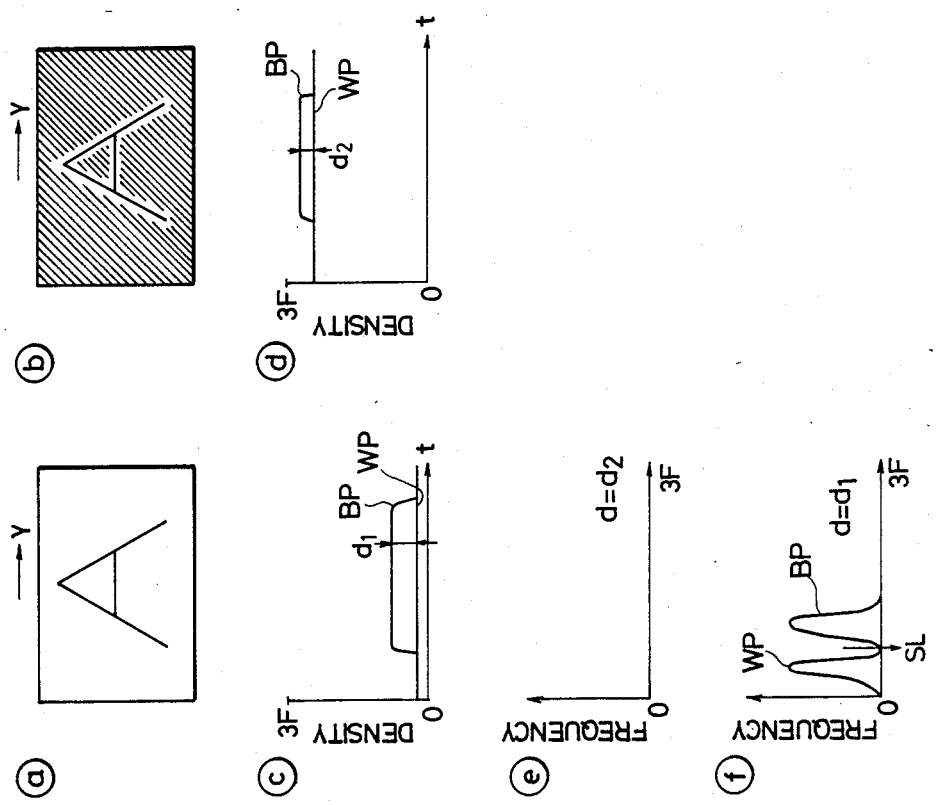
FIG. 14

4,907,286

IMAGE PROCESSING APPARATUS

This application is a continuation-in-part continuation of application Ser. No. 839,528 filed Mar. 14, 1986.

BACKGROUND OF THE INVENTION

1. Field of the Invention

The present invention relates to an image processing apparatus for electrically processing an original image.

2. Related Background Art

Image processing apparatuses such as facsimile systems are conventionally available which photoelectrically read original images and electrically process read image signals. In such an image processing apparatus, digital processing is more often performed recently due to the resulting simple processing and to its resistance against influence of external noise. Then, original images must be correctly converted into digital image signals.

Original images to be read have various states (density, size and the like), and they cannot all be processed by a single processing method. In view of this, the operator must first determine the type of an original image and adjust the image processing. However, such an adjustment is cumbersome and may result in an erroneous adjustment.

It can therefore be proposed to incorporate in an image processing apparatus a function for detecting the state of an original image and for automatically performing image processing suitable for each original image. With this method, the operator need not perform the adjustment described above, and an operator who is not accustomed to operation of image processing apparatuses in general can perform image processing with ease and accuracy.

However, when a reference signal for quantization of the image signal is determined in such automatic processing, the contents of an original image cannot be detected. That is, if the image density level is the same, original images of different contents may be quantized with the same reference signal. Thus, an image which must be emphasized, for example, cannot be properly emphasized.

SUMMARY OF THE INVENTION

The present invention has been made in consideration of this and has as its object to provide an image processing apparatus which can process images with high precision.

It is another object of the present invention to provide an image processing apparatus which can perform quantization suitable for the image density, size or the like of each original image.

According to one aspect of the present invention is provided an image processing apparatus which detects a density level of an original image, and prepares a plurality of reference signals for quantization of an image signal obtained by reading the original in accordance with the detected image density level. Any one of the prepared reference signals can be selected. Thus, the apparatus of the present invention can perform quantization in a mode selected by the operator and in accordance with each original image.

It is still another object of the present invention to provide an image processing apparatus which electrically processes an image, such as a facsimile system, a digital copying machine or an electronic image file apparatus, and which is suitable for converting an original image into an electrical signal.

It is still another object of the present invention to provide an image processing apparatus which can select one of a plurality of image processing methods, which is suitable for processing of a given original image.

The above and other objects, features and advantages of the present invention will become apparent from the following description when taken in conjunction with the accompanying drawings.

BRIEF DESCRIPTION OF THE DRAWINGS

FIG. 1 is a schematic view showing an original reader adopting the present invention;

FIG. 3 shows coordinates on an original placed on an original table;

FIGS. 9 and 14 are diagrams showing the determination operation of a slice level for each of various originals;

DETAILED DESCRIPTION OF THE PREFERRED EMBODIMENTS

Figure 2:
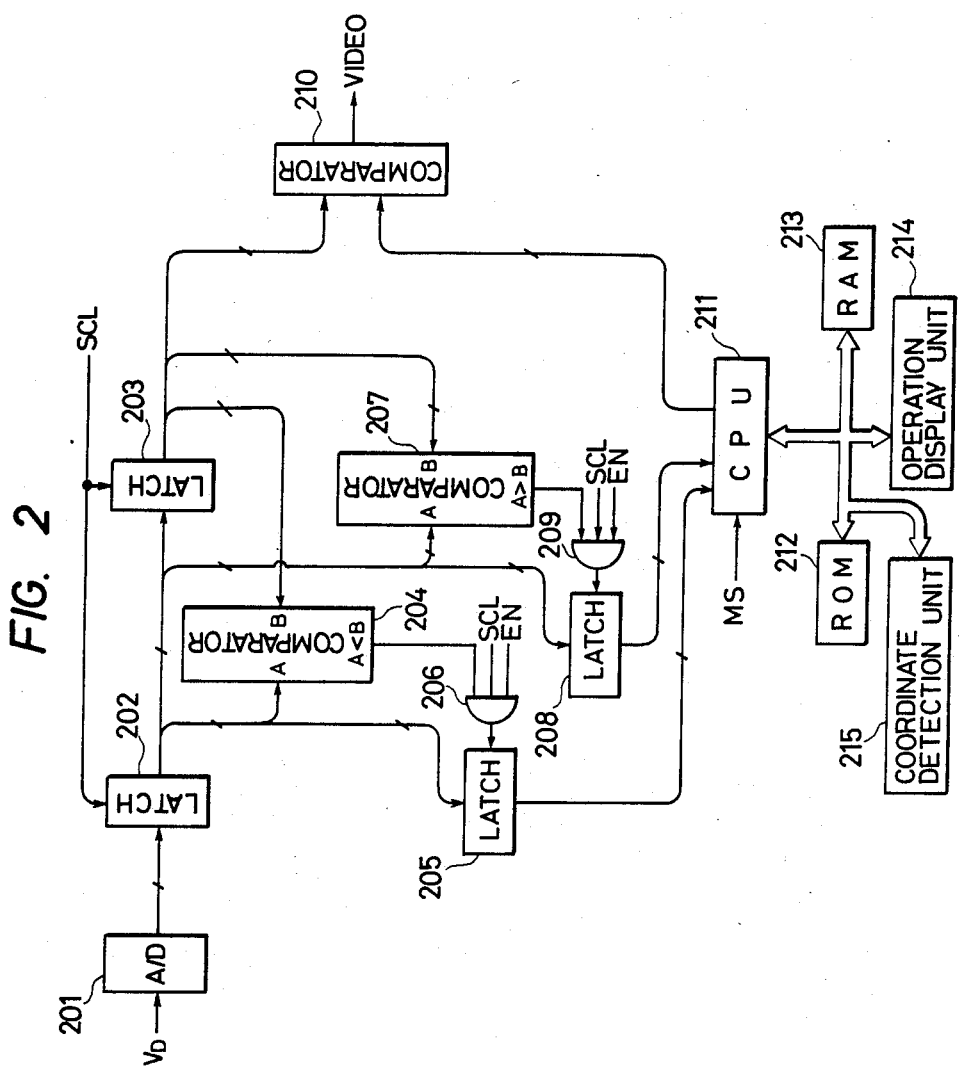
FIG. 2 is a block diagram of an image signal processing circuit.

The preferred embodiments of the present invention will be described in detail with reference to the accompanying drawings. FIG. 1 is a schematic diagram of an original reader to which the present invention can be applied. An original 102 is placed on an original table 101 and is lightly pressed by an original cover 110. An image sensor 103 such as a CCD line sensor consisting of several thousands of light-receiving elements reads the image information on the original 102. Illumination light from a light source 104 is reflected by a surface of the original 102, and the reflected light is focused onto the sensor 103 through mirrors 105, 106 and 107 and a lens 108. A set of the light source 104 and the mirror 105 and a set of the mirrors 106 and 107 move relative to each other at a speed ratio of 2:1. The optical unit consisting of the light source 104 and the mirrors 105, 106 and 107 is reciprocated at constant speed under PLL control by a DC servo motor 109. In the forward motion (from the left to right), the moving speed is variable within a range of 90 mm/sec to 360 mm/sec in accordance with the reading magnification. In the return motion (from the right to the left), the speed is set constant at 630 mm/sec.

The moving direction of the optical unit is defined as the sub-scanning direction, and a direction perpendicular thereto is defined as the main scanning direction. The (main scanning) optical unit is moved from the left end to the right end of each main scanning line to read the line at a resolution of 16 pel/mm. Thereafter, the optical unit is returned to the left end to complete main scanning of one line. In accordance with such operation, the entire surface of the original 102 set on the original table 101 is sequentially read line by line. The sensor 103 sequentially produces analog image signals representing the density of the read image for respective lines.

FIG. 2 shows a schematic block diagram of a circuit for processing the analog image signals from the sensor 103. An analog image signal VD from the sensor 103 is supplied to an A/D converter 201. The A/D converter 201 converts the signal VD into a 6-bit digital signal which digitally represents the density of each image pixel. The digital signal from the A/D converter 201 is supplied (as a 6-bit parallel signal) through a latch 202 to a latch 203, comparators 204 and 207, and latches 205 and 208, in synchronism with sampling data clocks SCL which are, in turn, synchronous with image data clocks CLK for reading the image signals from the sensor 103.

The comparator 204 compares the current 6-bit image signal from the latch 202 with the immediately preceding 6-bit image signal (one clock preceding) from the latch 203. If the former is smaller than the latter, the comparator 204 supplies a corresponding output (A<B) to an AND gate 206. The AND gate 206 supplies this input to the latch 205 in synchronism with the sampling clock SCL.

As in the comparator 204, the comparator 207 compares the current 6-bit image signal from the latch 202 with the immediately preceding 6-bit image signal (one clock preceding) from the latch 203. If the former is larger the latter, the comparator 207 supplies a corresponding output (A>B) to an AND gate 209. The AND gate 209 supplies the input from the comparator 207 to the latch 208 in synchronism with the sampling clock SCL.

In response to the outputs from the AND gates 206 and 209, the latches 205 and 208 latch the 6-bit image signal from the latch 202 and supplies it to a CPU 211. Upon this operation, the latches 205 and 208 store the minimum and maximum values, respectively, of the image signals input to the present.

In addition to the comparator outputs and the sampling clock SCL, the AND gates 206 and 209 also receive an enable signal EN representing the effective interval of each line of the image signal. Therefore, the comparison results for the image signal of each main scanning line are supplied from the latches 205 and 208 to the CPU 211.

The CPU 211 (comprising a microcomputer) fetches the image signals from the latches 205 and 208 in synchronism with a sync signal MS for each main scanning line, and thereby detects the lowest density level (to be referred to as a white peak hereinafter) and the highest density level (to be referred to as a black peak hereinafter) for each main scanning line.

Based on the black and white peaks determined for each line in this manner, the CPU 211 determines the slice level in accordance with an algorithm (to be described later) stored in a ROM 212 and supplies the determined slice level to a comparator 210. The comparator 210 compares the 6-bit image signal from the latch 203 with the 6-bit slice level from the CPU 211 so as to generate a binary signal (image data VIDEO) representing black/white of each pixel.

A coordinate detector 215 detects the coordinates (position) on the original 102 set on the original table 101. An operation/display section 214 is arranged on the top surface of the original reader. A memory (RAM) 213 temporarily stores the calculation data of the CPU 211 as a working memory.

FIG. 3 shows the state in which an original is placed on the original table 101 of the original reader (FIG. 1). The main scanning direction and the sub-scanning direction with reference to a reference point (SP) on the table 101 are represented by X and Y, respectively. The coordinates (X1, Y1), (X2, Y2), (X3, Y3) and (X4, Y4) of points P1, P2, P3 and P4 at the four corners of the original are detected by prescanning the optical system. The original cover 110 (FIG. 1) is mirror-polished so that the image data outside the area in which an original is placed is always detected as black data. Prescanning is performed covering the entire table surface in the main scanning direction and in the sub-scanning direction.

Figure 4:
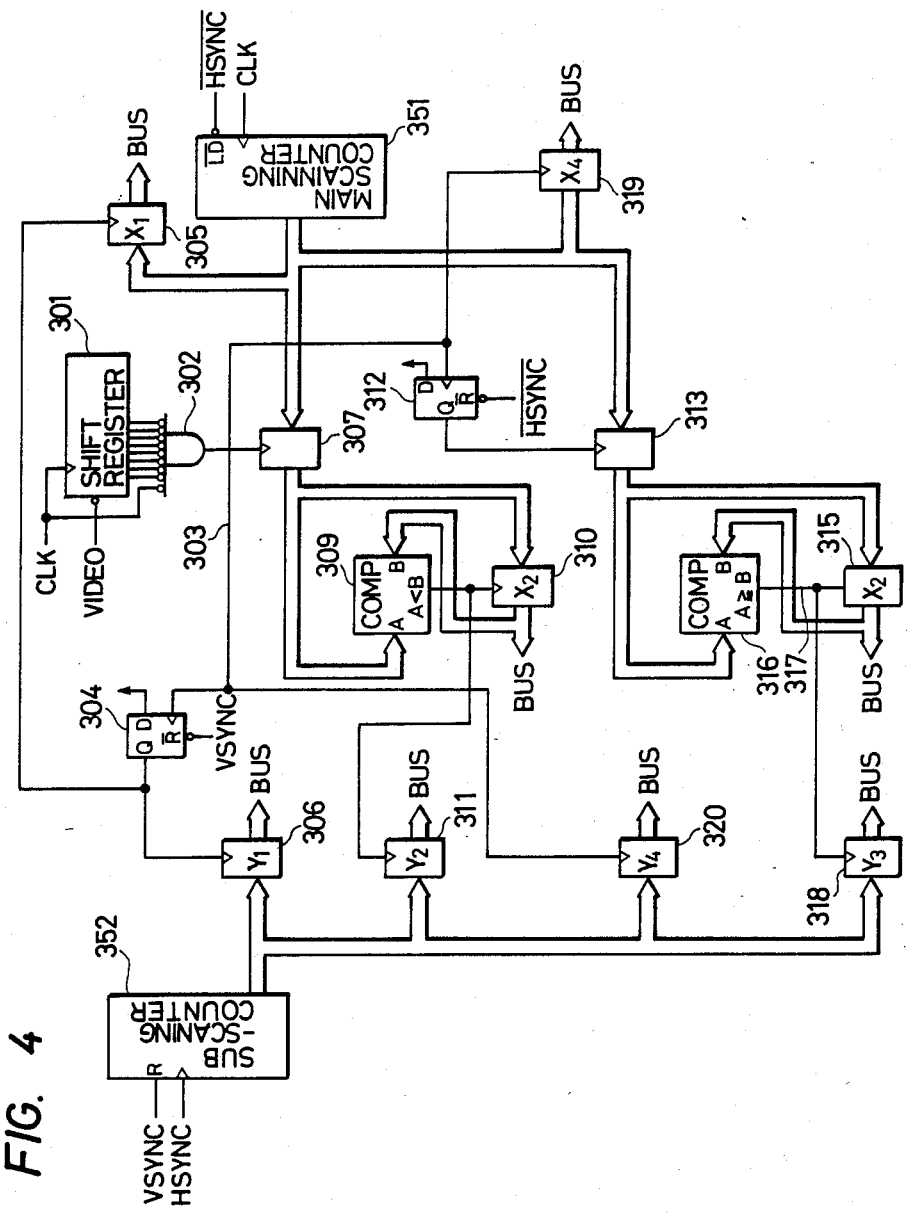
FIG. 4 is a block diagram of a coordinate detector.

FIG. 4 shows the detailed circuit configuration of the coordinate detector 215 (FIG. 2). A main scanning counter 351 is a down counter and its count represents the scanning position in a main scanning line. The counter 351 is set at the maximum value in the main scanning direction (X direction) by a horizontal sync signal HSYNC and counts down in response to each image data clock CLK. A sub-scanning counter 352 is an up counter and is reset to 0 at the leading edge of a signal (image leading end signal)VSYNC. The counter 352 counts up in response to each signal HSYNC and its count represents the scanning position in the sub-scanning direction.

In the prescanning process, the image signals from the sensor 103 are supplied after A/D conversion to a comparator 210 through the latches 202 and 203. The binary image data VIDEO from the comparator 210 is supplied to a shift register 301 in units of 8 bits. In the prescanning process, the CPU 211 supplies a predetermined slice level to the comparator 210. When 8 bits are input, an AND gate 302 checks if all the 8 bits from the shift register 310 are white image ("0" level). If so, the AND gate 302 supplies a "1" onto a signal line 303.

When light consecutive white bits first appear after prescanning is started, an F/F (flip-flop) 304 is set. The F/F 304 is reset by a signal VSYNC (image leading end signal output when forward motion of the optical unit is started). Thereafter, the F/F 304 is kept set until the next signal VSYNC is received.

The main scanning counter 351 counts down the clocks CLK which are synchronized with the respective pixels of the image data from the comparator 210. When the F/F 304 is set, the corresponding count of the counter 351 is loaded in a latch 305. This is a coordinate X1. The sub-scanning counter 352 counts up the signals which are synchronized with one line scanning. When the F/F 304 is set, the corresponding count (line number) in the counter 352 is loaded in a latch 306. This is a coordinate Y1. Thus, point P1 (X1, Y1) is determined.

Each time a "1" appears on the signal line 303, the count of the counter 351 is loaded in a latch 307. When the count of the counter 351 corresponding to the first white 8 bits is loaded in the latch 307, a comparator 309 compares the count with the data in a latch 310 (maximum value in the X-direction corresponding to the signal VSYNC). If the data from the latch 307 is smaller than the count, the comparator 309 produces a corresponding output (A<B) and data in the latch 307 is loaded in the latch 310. At the same time, the corresponding count in the sub-scanning counter 352 is loaded in a latch 311. This operation is performed before the next 8 bits are supplied to the shift register 301. When data comparison between the latches 307 and 310 is performed for the entire image region, the latch 310 stores the minimum value in the X-direction and the corresponding Y coordinate is loaded in the latch 311. More specifically, since the main scanning counter 351 is a down counter, the coordinate corresponding to the minimum value in the X-direction represents a coordinate which is closest to the point SP in the main scanning direction. Thus, point P2 (X2, Y2) is determined.

An F/F 312 is set when the first 8 white bits appear on the signal line 303 for each main scanning line. The F/F 312 is reset by a horizontal sync signal HSYNC and is kept reset until the next signal HSYNC is received. When the F/F 312 is set, the count of the main scanning counter 351 corresponding to the position of the first white signal sppearing in a single line is set in a latch 313. A comparator 316 compares the value set in the latch 313 with the value in a latch 315. The minimum value (0) in the X-direction corresponding to the signal VSYNC is preset in the latch 315. If the data of the latch 315 is smaller than or equal to that in the latch 313, a signal line 317 is enabled and the data of the latch 313 is loaded in the latch 315. This operation is performed between each two HSYNC signals. When this comparison operation is performed for the entire image region, the maximum value of the original coordinates in the X-direction, i.e., the X-coordinate of the white signal farthest from the scanning start point in the main scanning direction remains in the latch 315. This is a coordinate X3. When the signal line 317 is active, the sub-scanning value is loaded in a latch 318. This is a coordinate Y3. Thus, point Y3 (X3, Y3) is determined.

Each time 8 white bits appear on the signal line 303 over the entire image region, the corresponding counts of the main scanning counter 351 and the sub-scanning counter 352 are loaded in latches 319 and 320. Thus, when prescanning of the original is completed, the counts obtained when the last white bits appeared are in the respective counters. Point P4 (X4, Y4) is thus determined.

The data lines of the eight latches 306, 311, 320, 318, 305, 310, 315 and 319 are connected to a bus line BUS of the CPU 211. The CPU 211 fetches the data from these latches in the forward motion of the optical system in the prescanning process.

Figure 5:
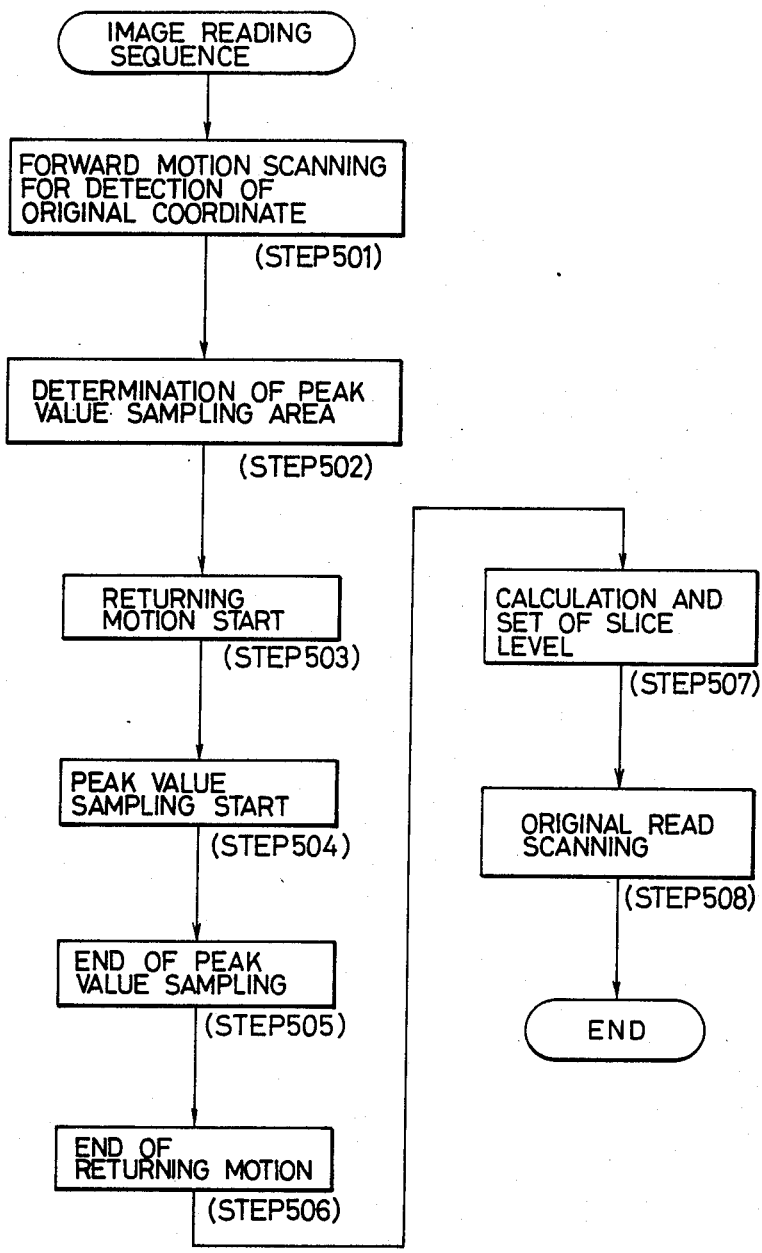
FIG. 5 is a flow chart of the original reading sequence.

FIG. 5 shows a flow chart of the original reading sequence. Steps 501 to 507 in FIG. 5 concern prescanning. In step 501, the optical unit moves forward form the left end to the right end of a line in FIG. 1. As described above, the coordinates of the four corners of the original on the table 101 are detected by the coordinate detector 215, and the detected coordinate data is fetched into the CPU 211.

In step 502, the area for sampling the peak values for determining the digitization slice level is calculated from the coordinate data detected in step 501. For example, a rectangular area defined by coordinates Y3 and Y2 and X1 and X4 is selected as a peak value sampling area of the original from the coordinate data detected for the original set as indicated by the hatched line in FIG. 6. Originals are normally set parallel to the original table. However, even if an original is lightly inclined as shown in FIG. 3, the peak value sampling area is set to be smaller than the actual original region, so that unnecessary information outside the original image may not be erroneously read. The sampling area can be determined by another appropriate method.

Figure 6:
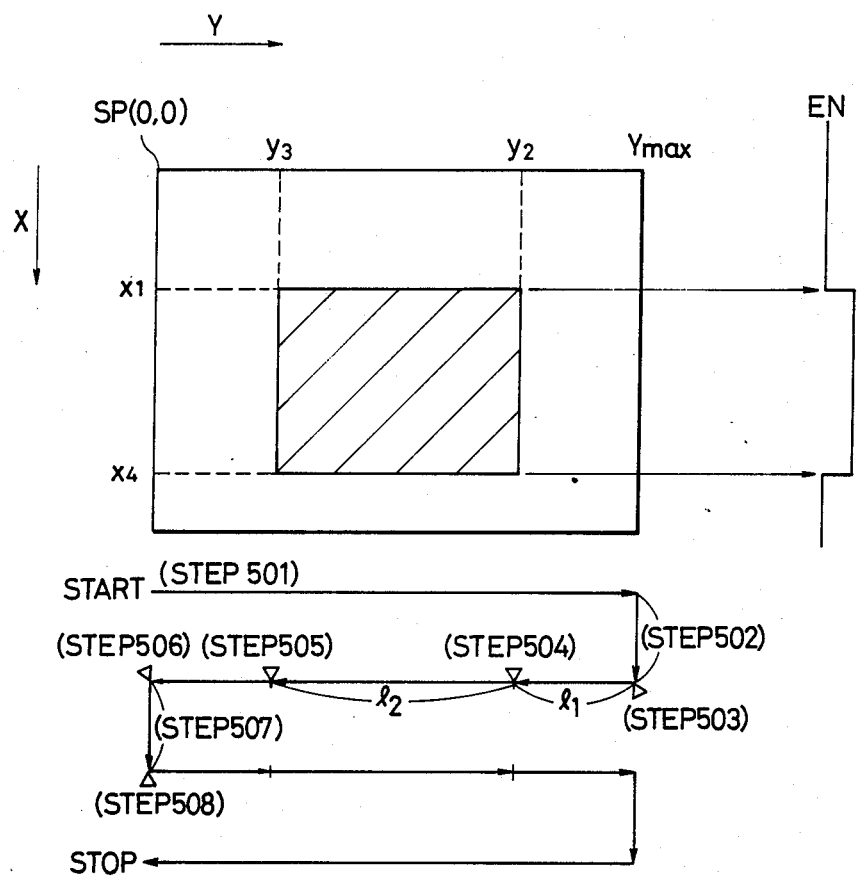
FIG. 6 is a diagram showing the correspondence between an original setting position and the original reading sequence.

As can be seen from FIG. 6, when original coordinate detection in step 501 is completed, the optical system is at point Ymax in sub-scanning direction. Since the peak sampling start point Y2 and end point Y3 are determined in step 502, steps 504, 505 and 506 in FIG. 5 can be performed.

When the optical system starts return motion in step 503, the CPU 211 counts the number of main scanning line sync signals corresponding to distance $l1(=Ymax-Y2)$ and thereafter starts detection of the black and white peak values described with reference to FIG. 2 (step 504). After counting the number of main scanning sync signals corresponding to distance $l2(=Y2-Y3)$ from that point, peak detection is completed (step 505). The return motion is stopped after counting the number of main scanning line sync signals corresponding to distance $l2$ (Y3) from that point (step 506).

When peak detection is started in step 504, the enable signal EN described above is set to be output in correspondence with the detected coordinates X1 and X4, as shown in FIG. 6.

With the operation as described above, the black and white peak values of the image density for each main scanning line within an original placed on an arbitrary point on the original table 101 can be detected reliably. Therefore, peak detection is not influenced by objects other than the original, i.e., the original cover or the like.

The algorithm for determining the slice level for digitization will be described below.

As has been described previously, the CPU 211 fetches the black and white peak values for each main scanning line from an original region. When the black and white peak values for an with main scanning line are represented by BPi and WPi, respectively, since image data has 6 bits, it has a value from 00 (HEX) to 3F (HEX) and $BPi \geq WPi$.

The RAM 213 has black and white peak histogram areas of 64×2 bytes, respectively. The CPU 211 counts up areas HB(j) and HW(j) for the respective histograms, which correspond to the detected data BPi and WPi. When the next main scanning line sync signal MS is received, the CPU 211 fetches the data BPi+1 and WPi+1 for the (i+1)st line and counts up the corresponding areas for the respective histograms. This operation of creating the histograms is continued until sampling in step 505 is ended.

It is to be noted that the detected BPi and WPi are not always used as histogram data. For example, if a stripe of uniform density is detected in the direction along the main scanning line direction, irrespective of whether this density is white, black or any other density, the sampled values BPi and WPi become substantially equal. In this case, if the corresponding data WPi and BPi are detected as information for a back ground portion and is used accordingly as data for digitization, proper digitization cannot be performed. In addition, a background portion may not always have a uniform density. Therefore, if black peaks as variations of the background level are used as information levels, proper digitization cannot be performed, either. When it is determined that $BPi-WPi \leq \alpha$, i.e., when the difference between the black and white peak values is smaller than a predetermined value and the density change is small, the data BPi and WPi are not used as the data for creating the histograms. Note that $\alpha$ is a constant which is determined from experience.

In other cases, dust or the like on the original table which is brighter than the background level may be sampled as a white peak, or contamination or the like which is darker than actual information may be detected as a black peak. In these cases, the data is not appropriate as data for creating the histograms. In view of this, when $BPi \geq \beta$ or $WPi \leq \gamma$, i.e., when the black and white peaks have specific values significantly deviating from corresponding reference values $\beta$ and $\gamma$. corresponding BPi and WPi are not used for creating the histograms. Note that $\beta$ and $\gamma$ are constants which are determined from experience.

Before sampling is started in step 504, the entire histogram areas (64×2×2 bytes) of the RAM 213 are cleared to "0".

Figure 7:
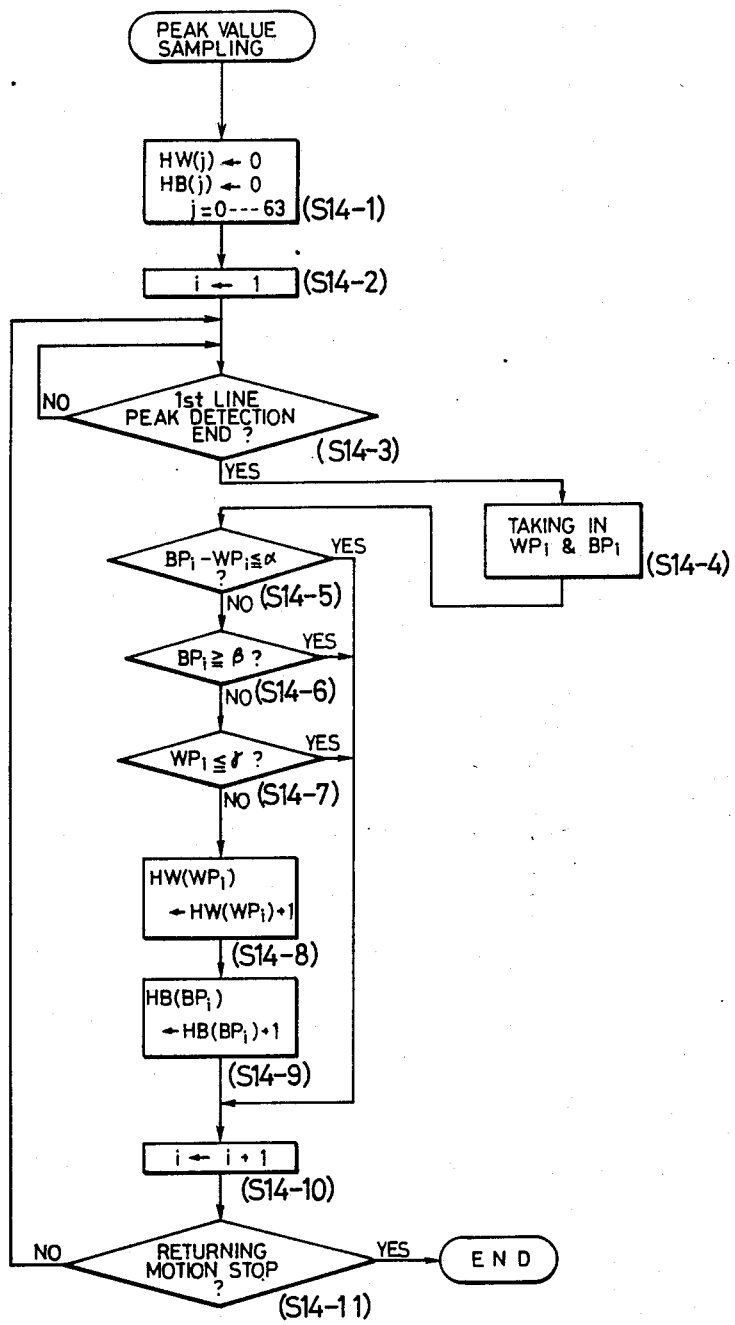
FIG. 7 is a flow chart showing the peak value sampling sequence.

FIG. 7 shows a detailed flow chart for peak value sampling in steps 504, 505 and 506. This flow chart will now be described in detail.

The CPU 211 first clears the areas HW(j) and HB(j) for creating the histograms in the RAM 213 to "0", (S14-1). The areas HW(j) and HB(j) are areas in the RAM 213, which respectively have 2 bytes for each j. Since i can change from value 0 (00HEX) to 63 (3FHEX) the detected peak values can assume, the area HW(j) has a total of 2×64=128 bytes for i=0, ..., 63, and the area HB(j) similarly has a total of 2×64=128 bytes. Note that HW(j) and HB(j) respectively represent the frequency of white and black peak values WPi (=j) and BPi (=j). If two bytes are available as a histogram creating area, a value up to 6,553 can be counted. Since the total number of main scanning lines for an A3 size paper sheet is 6,720 lines at a resolution of 16 pels, this count is sufficient.

The CPU 211 initializes the main scanning line number i (S14-2), and detects an end of the peak value detection for the first line by the main scanning line sync signal MS (S14-3). The CPU 211 fetches the white and black peak values WP1 and BP1 for the first line from the latches 205 and 208 (S14-4). When $BP1-WP1 \leq \alpha$ or the difference between the black and white peak values is smaller than or equal to the predetermined value $\alpha$, BP1 and WP1 are not used as histogram creating data (S14-5).

However, if $BP1-WP1 > \alpha$, it is then checked if $BP1 > \beta$ or the black peak value is larger than or equal to the predetermined value $\beta$. If YES in this case, BP1 and WP1 are not used as histogram creating data (S14-6).

If $BP1 < \beta$, it is then checked if $WP1 \leq \gamma$ or if the white peak value is smaller than or equal to the predetermined value $\gamma$. If YES, BP1 and WP1 are not used as histogram creating data (S14-7).

If $WP1 > \gamma$, WP1 and BP1 are used as histogram creating data. More specifically, the frequency area HW (WP1) in the RAM 213 which corresponds to the white peak value WP1 is counted up by one (S14-8), and the area HB (BP1) which corresponds to the back peak value BP1 is also counted up by one (S14-9).

In this manner, peak value sampling, creation of the histograms and cancellation of data are performed for the first line. Thereafter, the value of i is incremented in unitary increments of 2, 3, 4 and so on (S14-10) so as to perform similar processing for the second, third, fourth and other lines until return motion is stopped.

Figure 8A:
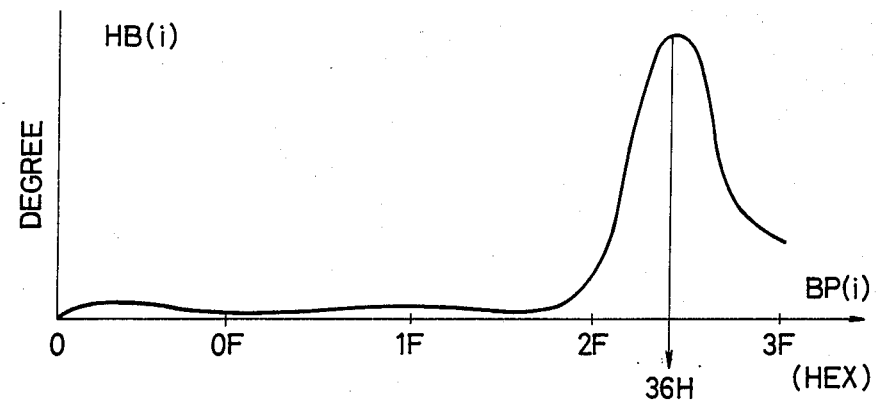
FIGS. 8 A and 8 B respectively show examples of black and white peak histograms.
Figure 8B:
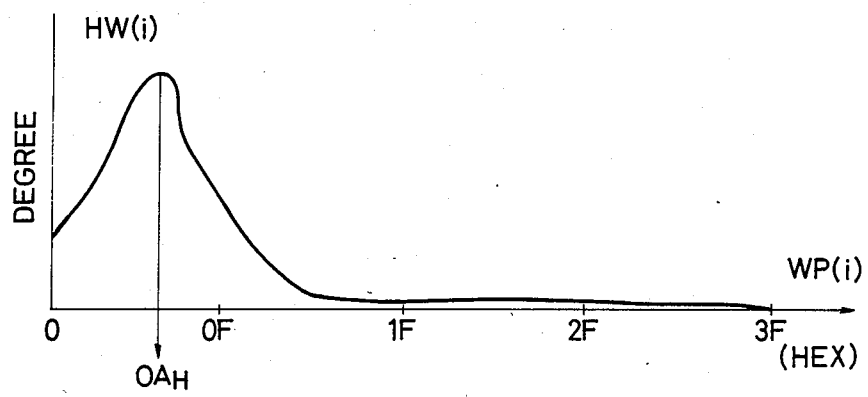

When sampling is ended in step 505 (FIG. 5), histograms as shown in FIGS. 8A and 8B have been created for the black and white peaks BP and WP.

In this manner, sampling is completed, the optical system is returned to the start point, and return motion is completed in step 506 when the slice level is set in step 507.

The setting operation for the slice level will be described below. The density level corresponding to the peak of the degree of each histogram is defined as the representative value.

In the examples illustrated in FIGS. 8A and 8B, the density of the original information portion is determined as 36H from FIG. 8A and the original background portion is determined to be 0AH from FIG. 8B. The central value 20H, e.g., is then determined as the slice level. The slice level can be determined by any other method, and the determination operation for the slice level will be described in more detail below.

In step 508, the original reading scanning is performed and the operation is ended. Note that the CPU 211 supplies the slice level determined in step 507 to the comparator 210.

Figure 9:
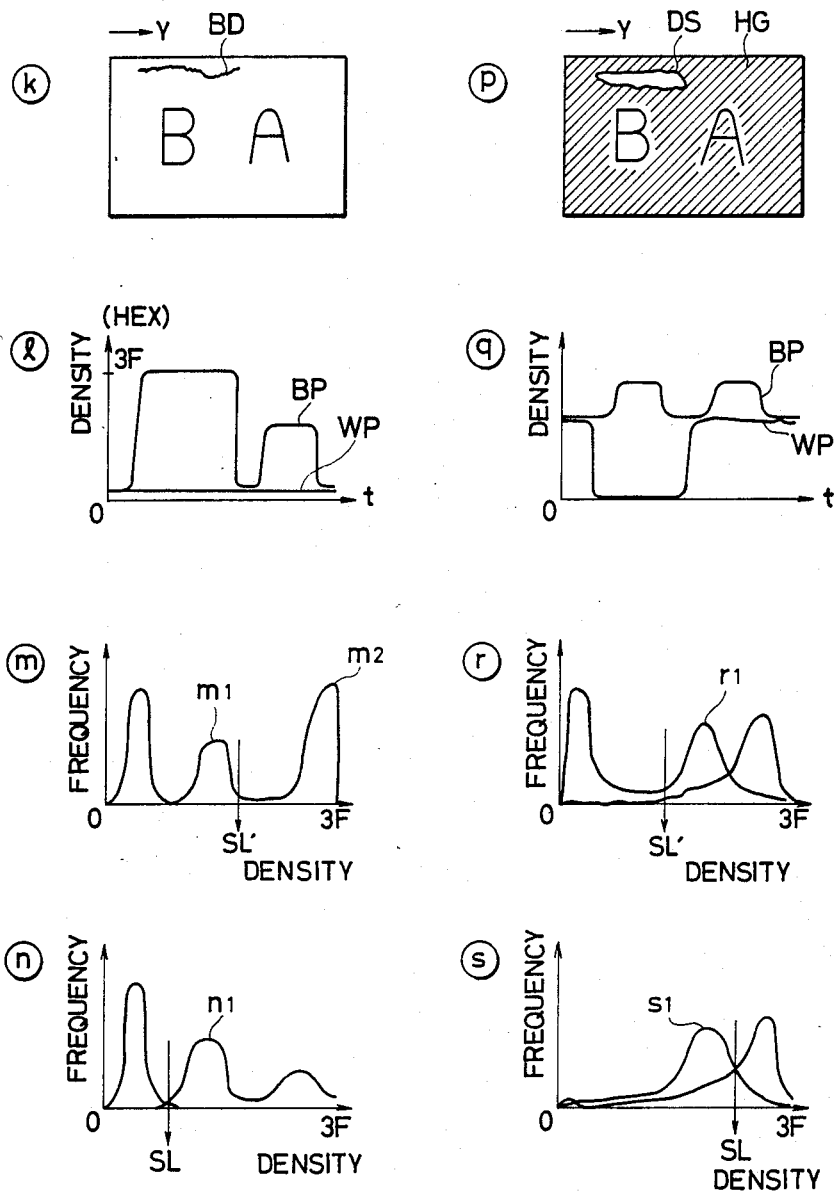

FIG. 9 will be described with reference to a case wherein a value darker than the actual information level is sampled as black peak value BP.

When a peak value is sampled from an original OG ⓚ contamination BD or the like on the original table, the contaminated portion BD results in a black peak value BP having a very dark value. Thus, white peak WP and the black peak BP are sampled as indicated in ①. When the detected data is directly used as histogram creating data, the maximum value for the black peak histogram at contaminated portion m2 becomes higher than information portion m1 as indicated in ⓜ. Therefore, the slice level is determined to be higher than the information portion, and proper digitization cannot be performed.

When the value $\beta$ is used and the black peak BP corresponding to the contaminated portion is not used as the histogram creating data, the black peak histogram has a maximum value at the density value corresponding to the information n1 as indicated in ⓝ a proper slice level SL can be determined.

FIG. 9 will similarly be described with reference to a case wherein a value lighter than the actual background level is sampled.

When an original ⓟ having dust DS or the like on the original table is read, a portion DS having the dust thereon is sampled as a white peak WP having a very light level, as indicated in ⓠ. When this data is directly used for creating the histograms, a slice level SL' is determined at a level lighter than the actual background level r1, as indicated in ⓡ, and proper digitization cannot be performed.

In such a case, when the value $\gamma$ described above is used and the white peak WP corresponding to the dust portion is not used as the histogram creating data, a white peak histogram is created in the actual background portion S1, as indicated in ⓢ, and a proper slice level SL can be determined.

When the correction operations of the black and white peaks BP and WP using the predetermined values $\beta$ and $\gamma$ described above are combined, a slice level which is not influenced by noise or the like can be obtained. In another alternative method, a parameter is set for one of the black and white peaks BP and WP. When either peak is smaller or larger than the parameter, the value can be cancelled as non-effective data for the histogram creating data.

Figure 10:
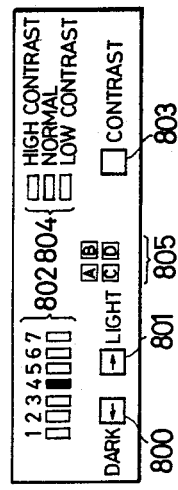
FIG. 10 is a diagram showing the outer appearance of an operation/display section.

FIG. 10 shows the outer appearance of the operation/display section 214 on the top surface of the original reader shown in FIG. 1. A density display unit 802 consists of 7 LEDs and can display 7 density levels. In the illustrated example, density level 4 is selected. Each time a key 800 is depressed, the display level at the unit 802 is shifted to the left. Each time a key 801 is depressed, the display level is shifted to the right.

A contrast key 803 can be used to select the contrast of the reproduced image. Each time the key 803 is depressed, three LEDs 804 display stepwise normal→high contrast→low contrast→and normal.

A mode key 805 is used to select the algorithm for determining the slice level. When the key 805 is depressed, a desired one of four algorithms to be described later is selected. The operation state of each key on the section 214 is fetched in the CPU 211, and the display section comprising the LEDs and the like displays in accordance with instruction from the CPU 211.

The density display level of the section 802 is represented by $f(=1, \ldots, 7)$, the density level of the original background portion estimated from the white peak histogram is represented by Wpp, and the density level of the original information portion estimated from the black peak histogram is represented by Bpp. Then, the slice level SL for digitization can be determined to be:

$$SL = (Bpp + Wpp)/2 + [(Bpp - Wpp)/8] \times (f-4)$$

Note that [and] are Gaussian symbols.

In the case described with reference to FIGS. 8A and 8B, Wpp=0AH and Bpp=36H. Therefore, the density display and the slice level correspond as shown in the table below.

| f | 1 | 2 | 3 | 4 | 5 | 6 | 7 |
|---|---|---|---|---|---|---|---|
| SL (HEX) | 11H | 16H | 1BH | 20H | 25H | 2AH | 2FH |

Figure 11C:
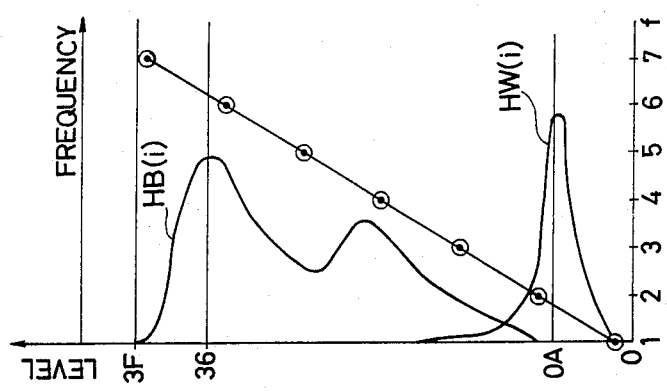
FIGS. 11 A, 11 B and 11 C are graphs showing the relationship between the peak value and slice level.
Figure 11B:
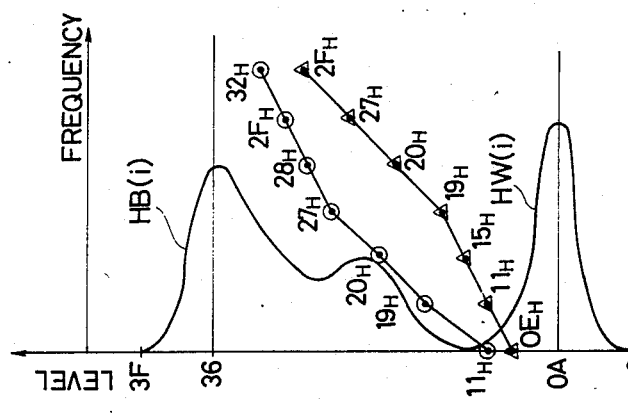
Figure 11A:
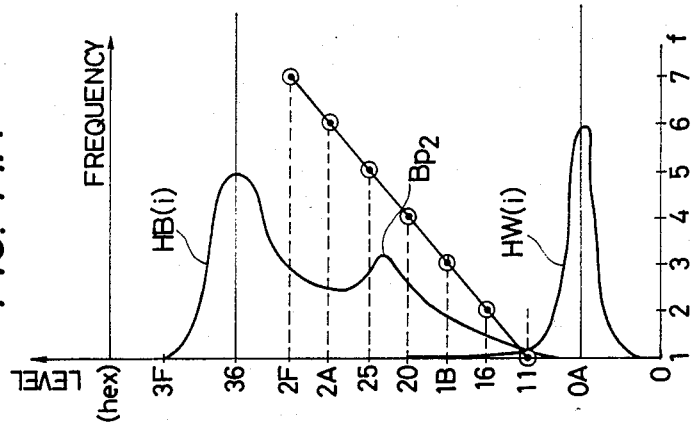

FIG. 11A shows a graph showing this relationship between the histogram and the slice level.

A plurality of slice levels obtained by dividing a range between the background level and the information level estimated by the peak detection can be changed using the keys 800 and 801 and the density display f. Therefore, a background portion can be reliably reproduce as a background portion, and a portion of an intermediate density can be set at a higher or lower density as needed.

For example, in the case as shown in FIG. 11A, wherein a second maximum value is present at point BP2 in the black peak histogram, the level corresponding to point BP2 cannot be determined to be the information or background level by the original reader. In this case, the operator operates the key 800 or 801 to select a density higher than f5 to determine the point BP2 as the background level or to select a density lower than f4 to determine the point BP2 as the information level.

The above method also improves the resolution of density display f. For example, assume that the slice level corresponding to each density display f is fixed as shown in the table below or FIG. 11C irrespective of the detected black and white peaks:

| f | 1 | 2 | 3 | 4 | 5 | 6 | 7 |
|---|---|---|---|---|---|---|---|
| Slice level | 02H | 0CH | 16H | 20H | 2AH | 34H | 3EH |

In this case, for an image having the black and white histograms as indicated in FIG. 11C, information read at levels f1 and f7 become white and black, respectively, and the data is not effective. In this case, f6 is located at an intermediate portion of the black peak, f2 at the white peak, and the background portion becomes dark. Therefore, only three levels of f3 to f5 can be expressed.

However, when the slice level is determined to correspond to the density display f between the estimated background and black levels as shown in FIG. 11A, 7 density levels can be provided.

The above description has been made with reference to digitization using one slice level, i.e., a case of a binary image output In digitization or quantization using two different slice levels, i.e., in the case of a three-value image output, the two slice levels can be determined in correspondence with the density display f and between the background and information levels estimated by peak detection, as shown in FIG. 11B.

Figure 12:
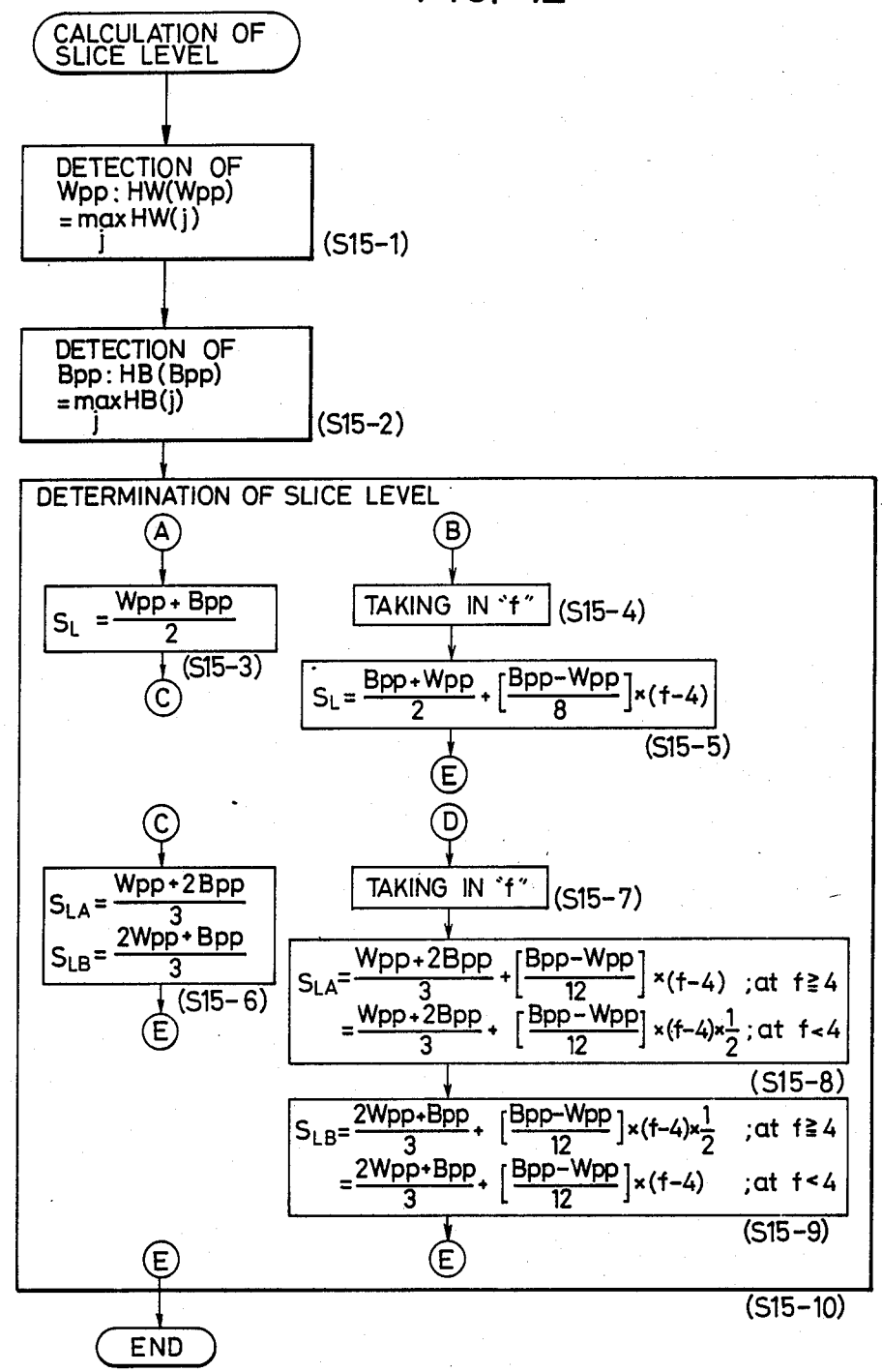
FIG. 12 is a flow chart showing the calculation sequence for the slice level.

FIG. 12 shows a flow chart for calculating the slice level. This flow chart will be described below. When the peak values are detected as described above, for the respective black and white peak histograms, a density level Wpp which satisfies HW(Wpp)=maxHW(j), i.e., the density level having a highest frequency in the white peak histogram, and a density level Bpp which satisfies HB(Bpp)=maxHB(j), i.e., the density level having a highest frequency in the black peak histogram are searched (S15-1, S15-2).

Thereafter, the slice level is determined in slice level determination step S15-10. In step S15-10, one of the four algorithms A, B, C and D is executed. The desired algorithm is selected by the mode key 805 at the operation/display section 214. All of the four algorithms need not always be included, and at least one algorithm must be arranged.

When the algorithm A is selected, an average value of Wpp and Bpp is used as a slice level SL for a binary image (15-3). When the algorithm B is selected, the slice level SL is determined to be between Wpp and Bpp by the density display level f, described with reference to FIG. 11A (S15-4,5).

When the algorithm C is selected, two slice levels SLA and SLB are determined to perform three-value image reading. The slice levels SLA and SLB divided the range between Wpp and Bpp into regions at a ratio of 1:1:1 (S15-6). In the example of FIG. 8 described above (Wpp=0AH, Bpp=36H), SLA 32 27H and SLB=19H. When the algorithm D is selected, two slice levels SLA and SLB for a three-value image are determined to be within a range between Bpp and Wpp. The slice levels SLA and SLB are calculated by:

$$SLA = \frac{W_{pp} + 2B_{pp}}{3} + \frac{B_{pp} - \frac{W_{pp} + 2B_{pp}}{3}}{4} \times (f-4) \quad [f \geq 4]$$

$$= \frac{W_{pp} + 2B_{pp}}{3} + \frac{\frac{W_{pp} + 2B_{pp}}{3} - W_{pp}}{4} \times (f-4) \quad [\text{for } f < 4]$$

-continued $$SL\ B = \frac{2W_{pp} + B_{pp}}{3} + \frac{B_{pp} - \frac{2W_{pp} + B_{pp}}{3}}{4} \times (f-4) \quad [\text{for } f \geq 4]$$

$$= \frac{2W_{pp} + B_{pp}}{3} + \frac{\frac{2W_{pp} + B_{pp}}{3} - W_{pp}}{4} \times (f-4) \quad [\text{for } f < 4]$$

In accordance with the above equations, the slice level SL and the density level f have the following relationship:

| f | 1 | 2 | 3 | 4 | 5 | 6 | 7 |
|---|---|---|---|---|---|---|---|
| SLA | 11H | 19H | 20H | 27H | 2BH | 2FH | 32H |
| SLB | 0EH | 11H | 15H | 19H | 20H | 27H | 2FH |

FIG. 11B shows this relationship in a graph.

Figure 13:
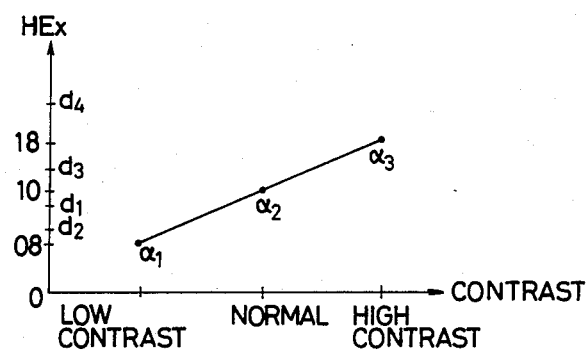
FIG. 13 is a graph for explaining the setting operation of the parameter $\alpha$.

The value α used to determine if the peak values obtained when the density change is small are used as histogram creating data can be changed as shown in FIG. 13 by using the contrast key 803 and the LEDs 804 shown in FIG. 10. Then, reliable digitization can be performed. The following description will be made with reference to FIGS. 13 and 14.

In an original ⓐ having a relatively low density such as a pencil document or an original ⓑ such as an diazo copy, the difference between the black and white peaks becomes d1 or d2 as indicated in FIG. 14 ⓒ or 14 ⓓ and is small over the entire original. Therefore, if only one value α2 is used for the value (α2>d1, d2), not all the detected peak values are used as the histogram creating data. Then, as shown in FIG. 14 ⓔ, a histogram may not be created at all. In such a case, the key 803 is used to select the low contrast LED 804 so as to select the minimum α1. Then, an appropriate slice level SL with a histogram shown in FIG. 14 ⓗ can be determined.

When the background has a partial irregularity as in an original g and the area of the information portion on the original is relatively small, a histogram becomes as shown in FIG. 14 ⓘ. When the value α is α2 as shown in FIG. 13m the slice level SL becomes low as shown in FIG. 14 ⓘ and the background becomes too dark. In such a case, the high contrast LED 804 is selected by operating the key 803 to select the maximum value α3. Then, an appropriate slice level as shown in FIG. 14 ⓙ is selected and darkening of the background portion can be eliminated.

Figure 15:
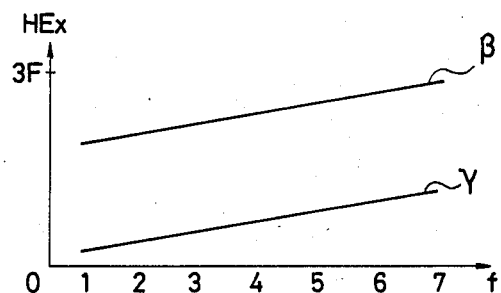
FIG. 15 is a graph for explaining the setting operation of the parameters $\beta$ and $\gamma$.

The values β and γ can be changed by the density display level f. When the values β and γ are set to correspond to the level f as shown in FIG. 15, the histogram is shifted toward the black side (to the right in the case in FIG. 7) and the slice level is increased as the density is closer to the level f7. The histogram is shifted to the white side (to the left in FIG. 7) and the slice level is reduced as the level becomes closer to the level f1.

Therefore, when the operator sets the level f in accordance with the original state, noise can be removed and undesired omission of image can be prevented.

Figure 16:
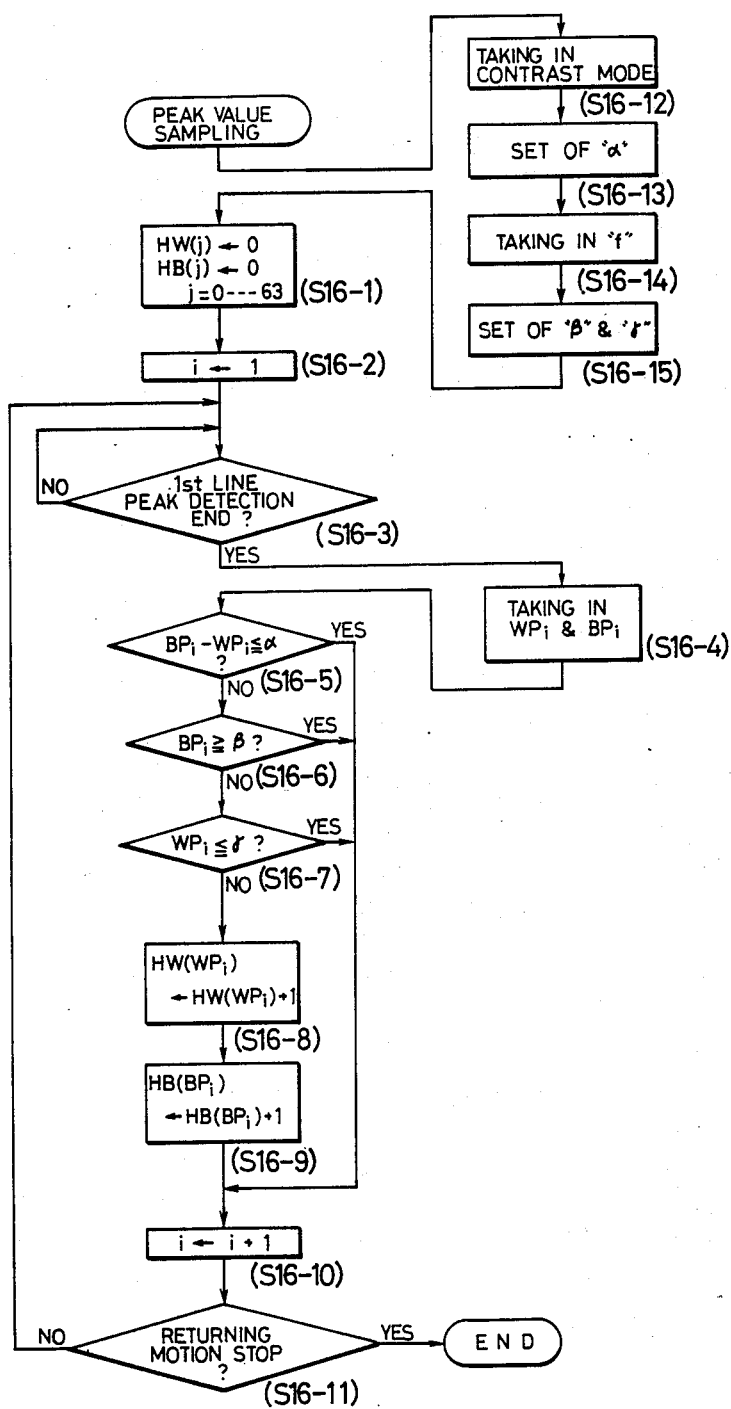
FIG. 16 is a flow chart showing another example of the peak value sampling sequence.

FIG. 16 shows a flow chart for peak value sampling when the constants α, β and γ described above can be changed by the operating the operating/display section shown in FIG. 10. This flow chart will be described below.

Steps S16-1 to S16-11 are the same as steps S14-1 to S14-11 described with reference to FIG. 7, and a detailed description thereof will be omitted.

When the constants α, β and γ are changed by operation at the operation/display section, before image scanning, the contrast mode selected by the operator is fetched (S16-12). One of values $\alpha^1$, $\alpha^2$ and $\alpha^3$ is set as the value α as shown in FIG. 13 (S16-13).

The density display level f selected by the operator is fetched in step S16-14, and the values β and γ are set as shown in FIG. 15 in accordance with the selected level f (S16-15).

In this manner, the values α, β and γ which are fixed values in FIG. 7 can be changed by the operator, and the operator can perform desired digitization.

As has been described above, in this embodiment, histograms are prepared for black and white peaks of an original to be read, and background and information density levels of the original are estimated, and the quantization level (slice level) for the image is determined using the estimated levels. Therefore, a slice level appropriate for each original to be read can be automatically set, and excellent quantization or digitization of images can be performed.

When histograms for setting a slice level are created, specific peak values which are attributable to contamination or dust are cancelled as non-effective values, and adverse influence on the set slice level due to such specific peak values is eliminated. In addition, black and white peaks from a region having a small density level change are also cancelled as non-effective values. Therefore, peak values only for regions having both background and information are used for creating histograms, and appropriate histogram can be set.

Since the operator can manually set various parameters used as references for eliminating unwanted peak values, any slice level can be set automatically. In addition, the set slice level is suitable to an original image to be read. When various parameters are manually set, an original image which may not be reproduced with good quality by automatic slice level setting can be quantized with precision.

In the present embodiment, an original image is scanned line by line, and black and white peaks are detected for each line. However, peak value detection can be performed once in every predetermined number of lines, and histograms can be prepared accordingly. When the original size or position is predetermined, coordinate detection operation can be omitted and peak detection of the original image can be started immediately. When the same original image is read a plurality of times, the slice level obtained in accordance with the peak values detected in the first prescanning can be used in the remaining reading operations. Thus, the slice level need be determined only once.

In this embodiment, an original placed on the fixed original table is read by moving the optical unit including a mirror and the like. However, the optical unit can be fixed in position, and the original or the original table can be moved instead.

An additional mode can be added to the apparatus. For example, in an additional mode, automatic slice level determination by peak value detection can be cancelled, and a predetermined slice level can be used for image reading. In addition, data other then the peak values can be used as data for setting the slice level. Furthermore, in addition to use for determination of the slice level for binary or three-value image reading, detection data obtained by prescanning can be used for selecting or forming threshold matrices for the dither method in accordance with each original to be read. A sensor for detecting the original state may be different from that for original reading. However, if such an additional sensor is used, the overall cost is increased and the configuration of the apparatus is rendered complex. When the background or information level of a specific original is known in advance, detection of both black and white levels need not be performed, and only one of the black and white levels may be performed. In the above embodiment, an image is read by light reflected from a sheet or book original. However, the present invention is similarly applicable when an image is read by transmission light such as for microfilms.

What is claimed is:

1. An image processing apparatus comprising:
   reading means for reading an original image and for outputting an image signal representing the original image;
   setting means for manually setting a desired processing mode for processing of the original image;
   detecting means for detecting image density levels of the original image based on the image signal read by said reading means; and
   processing means for processing the image signal from said reading means in accordance with a histogram of the image density levels detected by said detecting means, said processing means is adapted to process the image signal using a plurality of different processing methods in accordance with the histogram, and said processing means selects one of the plurality mode set by said setting means and processes the image signal using the selected processing method.

2. An apparatus according to claim 1, wherein said processing means quantizes the image signal from said reading means.

3. An apparatus according to claim 2, wherein said processing means forms a reference signal for quantization of the image signal in accordance with the histogram of the image density levels.

4. An apparatus according to claim 1, wherein said detecting means detects the image density levels of the original image in accordance with the image signal from said reading means during a pre-scanning operation of said reading means prior to reading the original image.

5. An apparatus according to claim 1, wherein said detecting means detects maximum and minimum values of the image density levels of the original image.

6. An apparatus according to claim 1, wherein said detecting means detects the image density level for each scanning line on the basis of the image signal.

7. An apparatus according to claim 1, wherein said processing means processes the image signal in accordance with a histogram of maximus and minimum values of the image density levels.

8. An apparatus according to claim 3, wherein said processing means is adapted to form the reference signal using any of a plurality of different processing methods.

9. An image processing apparatus comprising:
   reading means for reading an original image and for outputting an image signal representing the original image;
   setting means for manually setting a desired processing mode for processing of the original image;
   detecting means for detecting image density levels of the original image;
   forming means for forming a plurality of different reference signals in accordance with a histogram of the image density levels detected by said detecting means; and
   processing means for processing the image signal from said reading means in accordance with one of the plurality of different reference signals formed by said forming means, wherein said processing means selects one of the plurality of different reference signals in accordance with the desired processing mode set by said setting means and processes the image signal using the selected reference signal.

10. An apparatus according to claim 9, wherein said forming means forms the reference signal in accordance with a plurality of different processing methods, which are respectively associated with the plurality of processing modes.

11. An apparatus according to claim 9, wherein said forming means forms the reference signal for quantization of the image signal, and said processing means quantizes the image signal in accordance with the reference signal.

12. An apparatus according to claim 9, wherein said detecting means detects the image density level for each scanning line on the basis of the image signal representing the original image.

13. An apparatus according to claim 9, wherein said detecting means detects the image density levels of the original image in accordance with the image signal from said reading means during a pre-scanning operation of said reading means prior to the reading the original image.

14. An apparatus according to claim 13, wherein said detecting means detects maximum and minimum values of the image density levels.

15. An apparatus according to claim 9, wherein said forming means forms the reference signal in accordance with maximum and minimum values of the image density levels.

* * * * *

UNITED STATES PATENT AND TRADEMARK OFFICE
CERTIFICATE OF CORRECTION

PATENT NO. : 4,907,286
DATED : March 6, 1990
INVENTOR(S) : MASANORI YAMADA

It is certified that error appears in the above-identified patent and that said Letters Patent is hereby corrected as shown below:

COLUMN 1

Line 4, "continuation-in-part" should be deleted.

COLUMN 3

Line 40, "larger the" should read --larger than the--.
    Line 47, "supplies" should read --supply--.

COLUMN 4

Line 49, "light" should read --eight--.

COLUMN 5

Line 25, "sppearing" should read --appearing--.
    Line 41, "point Y3 (X3, Y3)" should read
        --point P3 (X3, Y3)--.
    Line 57, "form" should read --from--.

COLUMN 6

Line 42, "with main scanning line" should read
        --ith main scanning line--.
    Line 63, "back ground" should read --background--.
    Line 64, "is" should read --are--.

UNITED STATES PATENT AND TRADEMARK OFFICE
CERTIFICATE OF CORRECTION

PATENT NO. : 4,907,286

DATED : March 6, 1990

INVENTOR(S) : MASANORI YAMADA

It is certified that error appears in the above-identified patent and that said Letters Patent is hereby corrected as shown below:

COLUMN 7

Line 31, "the detected" should read --which the detected--.
    Line 64, "back peak" should read --black peak--.

COLUMN 8

Line 31, "contamination" should read --having contamination--.
    Line 46, "a proper" should read --and a proper--.

COLUMN 10

Line 22, "output" should read --output.--.
    Line 47, "(15-3)." should read --(S15-3).--.
    Line 56, ""SLA 32 27H" should read --SLA = 27H--.
    Line 65, "[f $\geq$ 4]" should read --[for f $\geq$ 4]--.

COLUMN 11

Line 29, "an" (second occurrence) should read --a--.
    Line 42, "original g" should read --original ⓖ--.
    Line 45, "Fig. 13m" should read --Fig. 13--.

COLUMN 12

Line 65, "then" should read --than--.

UNITED STATES PATENT AND TRADEMARK OFFICE
CERTIFICATE OF CORRECTION

PATENT NO. : 4,907,286
DATED : March 6, 1990
INVENTOR(S) : MASANORI YAMADA

It is certified that error appears in the above-identified patent and that said Letters Patent is hereby corrected as shown below:

COLUMN 13

Line 33, "plurality mode" should read --plurality of processing methods in accordance with the processing mode--.

COLUMN 14

Line 1, "maximus" should read --maximum--.
    Line 46, "the reading" should read --reading--.

Signed and Sealed this

Twenty-sixth Day of November, 1991

Attest:

HARRY F. MANBECK. JR.

*Attesting Officer*      *Commissioner of Patents and Trademarks*